(12) United States Patent
Sommer et al.

(10) Patent No.: US 9,395,111 B2
(45) Date of Patent: Jul. 19, 2016

(54) MOTOR COOLING METHOD FOR A COMPRESSOR

(71) Applicant: JOHNSON CONTROLS TECHNOLOGY COMPANY, Holland, MI (US)

(72) Inventors: Steven T. Sommer, York, PA (US); Jeb W. Schreiber, Emigsville, PA (US); Steven J. Estes, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 33 days.

(21) Appl. No.: 14/423,472

(22) PCT Filed: Oct. 23, 2013

(86) PCT No.: PCT/US2013/066310
§ 371 (c)(1),
(2) Date: Feb. 24, 2015

(87) PCT Pub. No.: WO2014/084989
PCT Pub. Date: Jun. 5, 2014

(65) Prior Publication Data
US 2015/0226467 A1    Aug. 13, 2015

Related U.S. Application Data

(60) Provisional application No. 61/730,533, filed on Nov. 28, 2012.

(51) Int. Cl.
*F25B 31/00* (2006.01)
*H02K 11/00* (2016.01)
(Continued)

(52) U.S. Cl.
CPC .............. *F25B 31/008* (2013.01); *F04D 25/06* (2013.01); *F04D 29/058* (2013.01);
(Continued)

(58) Field of Classification Search
CPC ............. H02K 5/20; H02K 7/09; H02K 9/20; H02K 11/00; H02K 9/10; F04D 29/058; F04D 25/06; F04D 29/584; F04D 29/5806; F25B 31/008
USPC .......................................... 62/79, 505; 310/55
See application file for complete search history.

(56) References Cited

U.S. PATENT DOCUMENTS 3,241,331 A    3/1966  Endress et al.
4,264,834 A *  4/1981  Armor .................... H02K 9/10
                                                 310/55

(Continued)

FOREIGN PATENT DOCUMENTS

GB         1 344 698 A    1/1974

OTHER PUBLICATIONS

PCT International Search Report & Written Opinion, 11 pgs, Nov. 11, 2014.

*Primary Examiner* — Mohammad M Ali
(74) *Attorney, Agent, or Firm* — McNees Wallace & Nurick LLC

(57) ABSTRACT

A method for cooling a compressor motor (170) and a cooling circuit utilizing refrigerant that originates in the condenser (30) to cool a motor (170) and electromagnetic bearings (196, 206). The motor drives a compressor (20), while the electromagnetic bearings support the motor rotor (178) during operation of the compressor. Liquid refrigerant from the condenser is expanded into a two-phase mixture, passed over the stator, expanded a second time, passed over the bearings and between the stator and rotor, before being returned to an evaporator (50).

15 Claims, 5 Drawing Sheets

(51) Int. Cl.
*H02K 5/20* (2006.01)
*H02K 7/09* (2006.01)
*H02K 9/10* (2006.01)
*H02K 9/20* (2006.01)
*F04D 29/058* (2006.01)
*F04D 29/58* (2006.01)
*F04D 25/06* (2006.01)

(52) U.S. Cl.
CPC ......... *F04D 29/584* (2013.01); *F04D 29/5806* (2013.01); *H02K 5/20* (2013.01); *H02K 7/09* (2013.01); *H02K 9/10* (2013.01); *H02K 9/20* (2013.01); *H02K 11/00* (2013.01)

(56) References Cited

U.S. PATENT DOCUMENTS

| 2004/0189126 | A1* | 9/2004 | Brunet | F16C 32/0468 |
| | | | | 310/90.5 |
| 2008/0185924 | A1* | 8/2008 | Masoudipour | H02K 5/20 |
| | | | | 310/54 |
| 2008/0224551 | A1* | 9/2008 | Saban | H02K 9/12 |
| | | | | 310/54 |
| 2009/0044548 | A1 | 2/2009 | Masoudipour et al. | |

* cited by examiner

MOTOR COOLING METHOD FOR A COMPRESSOR

FIELD OF THE INVENTION

The present invention is generally directed to motor cooling. And specifically directed to motor cooling scheme for a compressor.

BACKGROUND OF THE INVENTION

A well-known refrigeration cycle is a closed loop system in which refrigerant, the working fluid, is compressed by a compressor that increases the pressure of the refrigerant gas. The compressor is driven by a motor that is controlled by a control panel. High pressure refrigerant from the compressor is discharged through the compressor discharge which is in fluid communication with a condenser that condenses the high pressure gas into a pressurized fluid. In one embodiment, the compressor is a centrifugal compressor. Alternatively, the compressor may be a reciprocating, rotary, scroll, or screw compressor.

The condenser is in heat exchange communication with a first heat transfer medium that removes heat of condensation from the refrigerant, resulting from the change of state of refrigerant from hot, high pressure gas to liquid. This heat transfer medium may be the atmosphere (air or forced air) or a liquid, preferably water. The various ways of removing this heat are well know and do not contribute to the inventive nature of this invention. The condensed refrigerant from the condenser is in fluid communication with an expansion device that expands at least some of the pressurized fluid into a gas as it flows within the closed loop refrigeration system. The closed loop system from the discharge of the compressor to the expansion valve is termed the high pressure side of the refrigeration system or circuit.

After the refrigerant exits the expansion device as a mixture of gas and liquid, its pressure is reduced. The evaporator receives the refrigerant with lowered pressure from the expansion device. The evaporator is in heat exchange communication with a second heat transfer medium. The refrigerant in the evaporator absorbs heat from the second heat transfer medium as the liquid portion of the refrigerant undergoes a change of state to a vapor. As this heat is absorbed, the heat transfer medium is cooled. The heat transfer medium may be used directly to cool or refrigerate an area, for example when the heat transfer medium is air, or it may be used to cool a liquid, such as water and conveyed to another heat transfer device in an area or room, such as in chilled water applications. In such applications, the chilled water is sent to heat transfer devices in separate areas of a building on demand. The refrigerant gas from the evaporator is then returned to the suction side of the compressor to complete the circuit. The closed loop system between the expansion device and the suction side of compressor is termed the low pressure side of the system circuit.

A motor operates the compressor. The motor used with the compressor can be powered by a variable speed drive (VSD) or can be powered directly from an alternating current (AC) or direct current (DC) power source. The motor may include any type of electric motor that can be powered by a VSD or directly from an AC or DC power source. The motor can be any suitable motor type, for example, a switched reluctance motor, an induction motor, or a permanent magnet motor.

The electric motor that operates such compressors typically includes a housing, a rotor and a stator. The housing generally provides a hermitic seal for the motor. Electrical power operates the stator that in turn causes the rotor to rotate. A shaft from the compressor is connected to the motor rotor, which rotates the compressor. The power provided to the stator generates significant heat in the motor, which must be cooled to prevent overheating and damage. Various cooling schemes have been used to cool these motors, including water jackets circulating cooling water around the motor.

The trend in modern compressors is to utilize electromagnetic bearings to support the rotor. These electromagnetic bearings also draw power for operation from the power supply and also may generate significant heat that requires removal from the system.

What is desired is a cooling scheme to remove excess heat from a motor and from electromagnetic bearings and their controls utilized with a compressor. Ideally, the cooling circuit should utilize fluid already used with the refrigerant circuit.

BRIEF DESCRIPTION OF THE INVENTION

The present invention provides a cooling circuit that utilizes refrigerant that originates in the condenser to cool a motor and electromagnetic bearings and their controls. The motor drives a compressor, and the electromagnetic bearings support the motor rotor during operation of the compressor.

The motor includes an exterior housing, providing a hermetic seal for the motor. A motor stator is positioned inside the motor housing. The stator comprises windings or a series of windings. A rotor is positioned within the stator. A spacer is positioned between the housing and the motor stator. Prior to providing power to the stator, electromagnetic bearings are energized with power from the power supply to support the rotor. Once the rotor is properly supported, stator windings are energized by the power supply, causing the rotor to rotate within the electromagnetic bearings.

Liquid refrigerant is provided to the motor to cool both the stator and the electromagnetic bearings. Liquid refrigerant from the condenser enters the motor housing and circulates around a gap between the motor housing and the spacer. The spacer comprises a highly conductive material selected to transfer heat from the stator and its windings to the refrigerant, thereby removing heat from the stator. Stators usually are impregnated with a varnish. Because of the high flow of refrigerant, the spacer is provided to prevent leakage of the refrigerant through any gaps that may exist between the stator laminations and into the space between the stator and rotor. Such leakage may reduce the energy efficiency of the compressor. The spacer may be attached to the stator by means of a shrink fit. A pin through the housing into the spacer prevents inadvertent movement of the stator relative to the housing, such as damaging rotation and axial motion of the stator.

After circulating through the gap between the spacer and the housing, the refrigerant is passed through an expansion device where its pressure and temperature are lowered. The refrigerant leaving the expansion device may be a two phase mixture that is circulated to the portion of the housing where the bearings are positioned. The refrigerant cools the bearings and refrigerant gas passes between the stator and the rotor to provide cooling. The liquid refrigerant that is drained prior to entering the gap between the stator and the rotor is collected in the housing where it flows to the evaporator. Refrigerant gas passing through the gap between the stator and the rotor primarily cools the stator, exiting the gap at the other end where it cools the electromagnetic bearings at the other end before flowing to the evaporator.

The cooling circuit for the compressor motor and bearings, in its broadest embodiment, includes the compressor motor comprising a motor housing with a cavity, a stator positioned within the housing and a rotor within the stator. Bearings are utilized to center the rotor within the stator during operation. The cooling circuit includes a refrigerant inlet in the motor housing providing refrigerant liquid to cool the motor. A spacer extends 360° around the stator. The spacer is positioned between the motor housing and the stator. This creates a gap between the spacer and the stator through which refrigerant liquid from the refrigerant inlet passes to remove heat from the stator and the motor housing as the refrigerant changes state from liquid to a gas fluid as it passes through the gap. An alignment pin extending through the motor housing and the stator prevents relative rotation of the motor housing, the stator and the spacer. An expansion device reduces the pressure of refrigerant fluid while converting it to a two phase mixture after it has passed through the gap. A first fluid passageway provides communications for refrigerant as it passes through the gap to the expansion device. A second fluid passageway receives the two phase refrigerant from the expansion device and routes the refrigerant to the motor housing cavity. A liquid outlet removes liquid refrigerant that may condense before it reaches the motor housing. A stator/rotor annulus then receives the remaining two phase mixture of refrigerant that has not condensed into a liquid from the second fluid passageway at a first end of the motor housing. The refrigerant passes through the annulus and cools bearings, the rotor and the stator as it traverses the axial length of the motor housing. A vent then provides an exit to remove refrigerant fluid from the motor housing after passing through the motor housing, most of which should have converted to a refrigerant gas.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
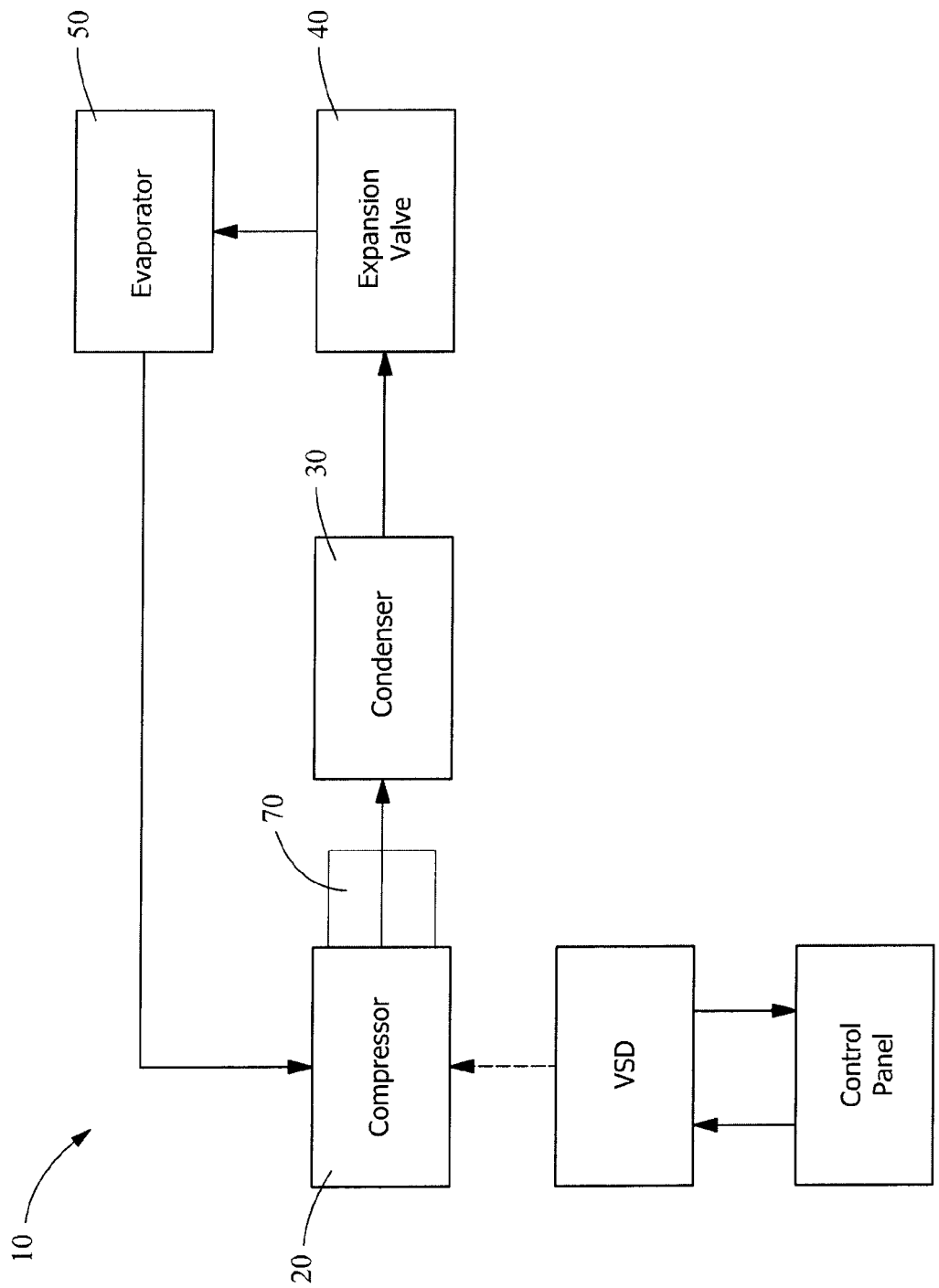
FIG. 1 is a schematic of a prior art refrigeration circuit.
Figure 3:
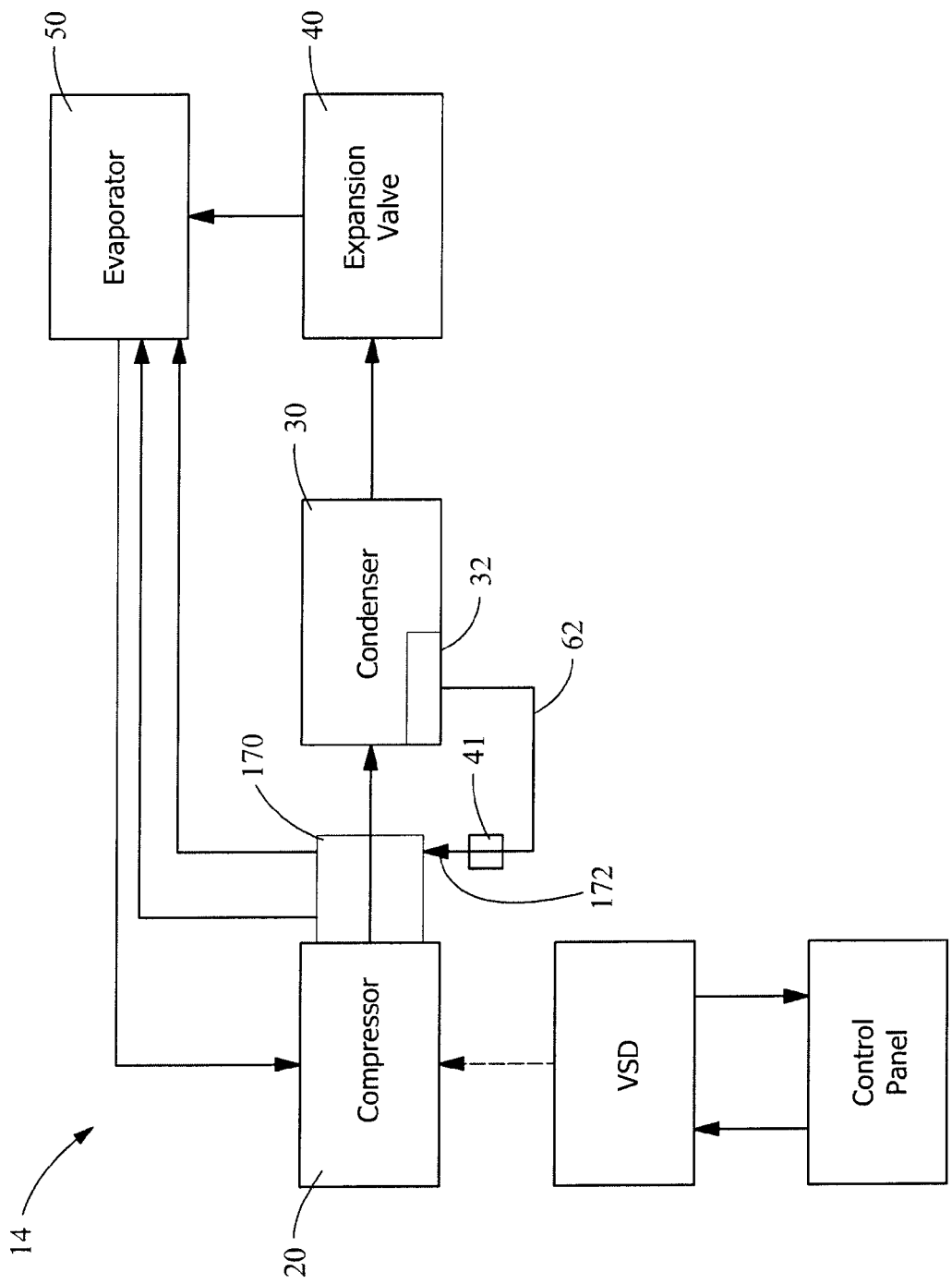
FIG. 3 a schematic of a second embodiment of the refrigerant circuit of the present invention.

The refrigerant circuit of the present invention differs in some regards from a standard refrigerant circuit. FIG. 1 is a schematic of a well known refrigerant circuit 10. The flow of refrigerant in the refrigeration circuit is shown by solid lines. Also shown in FIG. 1 are the electrical connection between the variable speed drive (VSD) and motor 170, and the draw of power from the VSD to motor 170, represented by a dashed line, to distinguish the electrical circuits from the refrigeration circuits. As shown, the VSD is in communication with the control panel. The control panel, not shown in FIG. 1 but shown schematically in FIG. 3, is also in communication with the refrigeration system. High pressure refrigerant from the compressor 20 is discharged through compressor discharge port which is in fluid communication with a condenser 30 that condenses the high pressure refrigerant gas into a hot pressurized liquid. Condenser 30 is in heat exchange communication with a first heat transfer medium (not shown) that removes heat of condensation from the refrigerant, resulting from the change of state (condensation) of refrigerant from hot, high pressure gas to liquid. The condensed refrigerant from the condenser 30 is in fluid communication with an expansion device 40 that expands at least some of the pressurized refrigerant liquid into a two-phase comprising refrigerant liquid and gas, as its pressure is reduced. An evaporator 50 receives the two-phase refrigerant. The evaporator 50 is in heat exchange communication with a second heat transfer medium. Heat is absorbed by the refrigerant in evaporator 50 from the second heat transfer medium, as the liquid refrigerant undergoes a change of state to a vapor. As this heat is absorbed, the heat transfer medium is cooled. The refrigerant gas from the evaporator 50 is then returned to the suction side of the compressor to complete the circuit. The closed loop system immediately after expansion device 40 to the suction side of compressor 20 is termed the low pressure side of the refrigeration circuit 10.

Figure 2:
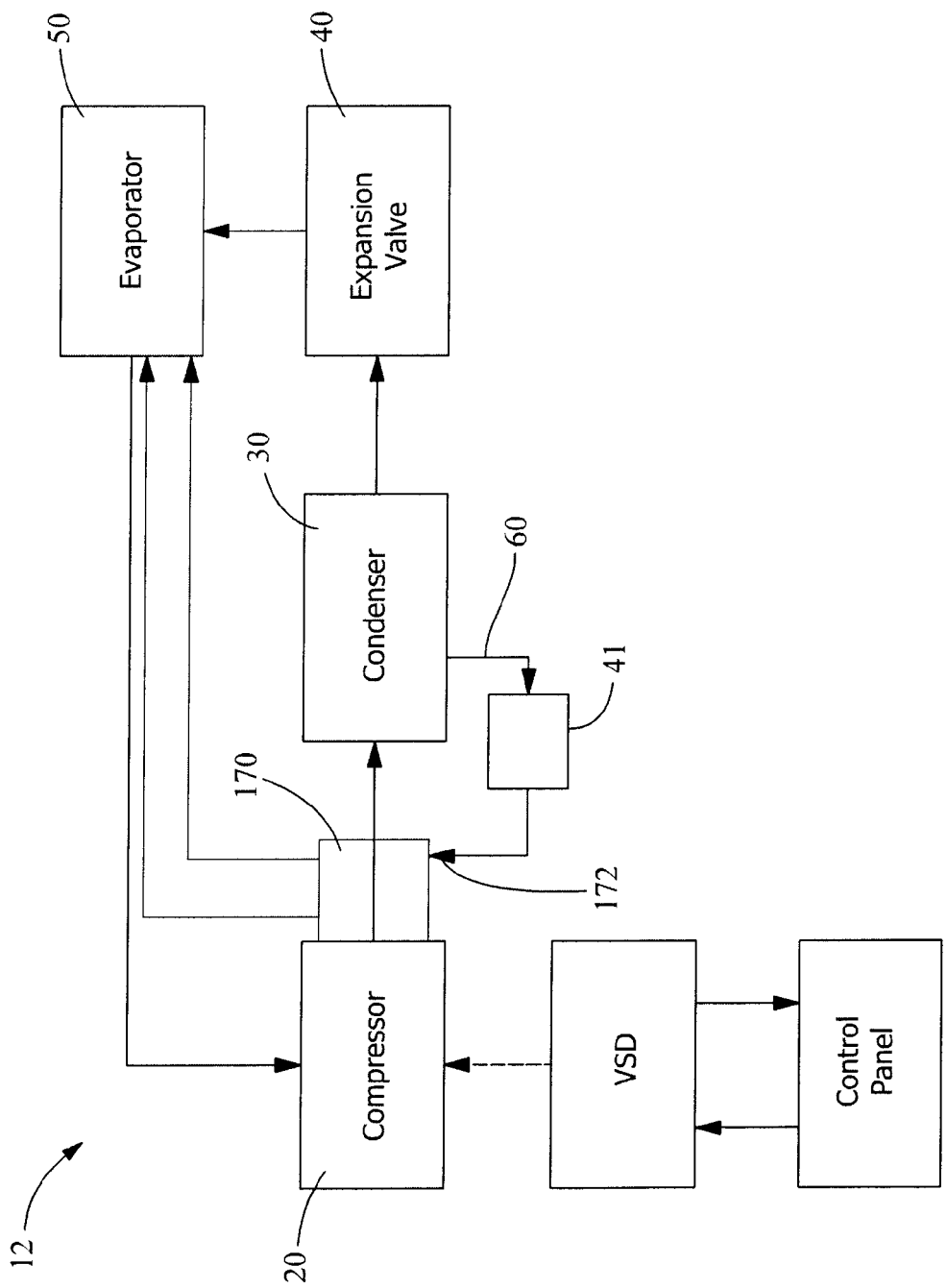
FIG. 2 is a schematic of a first embodiment of the refrigerant circuit of the present invention.

In a first embodiment of the present invention, depicted in FIG. 2, the circuit of the present invention is similar to the prior art circuit, but does differ from the prior art circuit. FIG. 2 depicts circuit 12 of the present invention. In circuit 12, some refrigerant is directed along a conduit 60 from condenser 30 to compressor motor 170, where it enters motor 170 through an inlet 172 in motor 170. Optionally, the liquid may pass through a second expansion device 41, which may be an expansion valve, before entering motor inlet 172.

A second embodiment of the present invention is depicted in FIG. 3 and is similar to the first embodiment, circuit 12 depicted in FIG. 3. FIG. 3 depicts circuit 14 of the present invention. In circuit 14, refrigerant liquid from condenser 30 is drawn to a subcooler 32, which is typically internal to condenser 30, where the temperature of the refrigerant liquid is lowered. Refrigerant from subcooler 32 is directed along a conduit 62 to compressor motor 170, where it enters motor 170 through the inlet 172 in motor 170. Optionally, the liquid may pass through a second expansion device 41, which also may be an expansion valve, before entering motor inlet 172.

Figure 4:
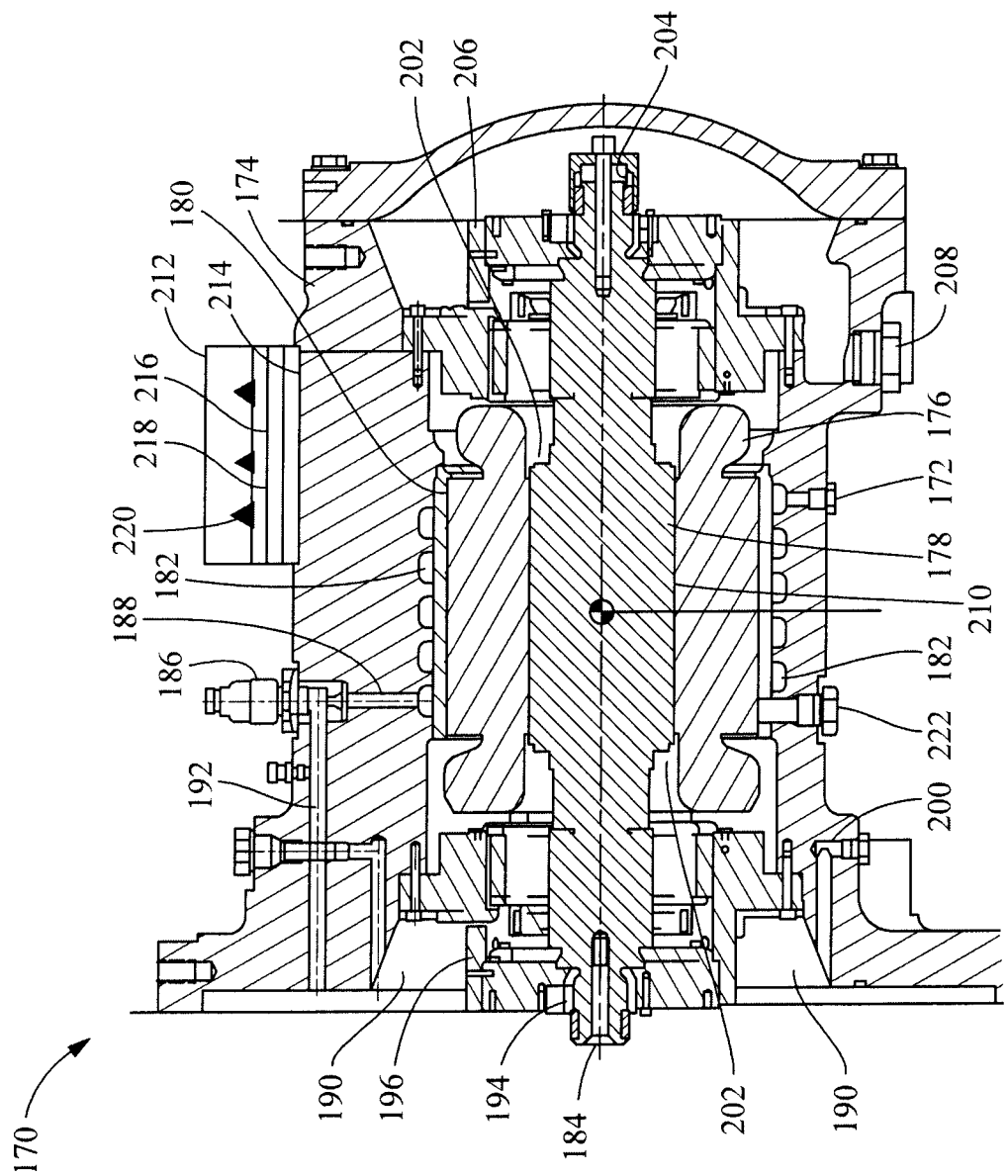
FIG. 4 is a cross section of a motor of the present invention.

FIG. 4 is a cross-sectional representation of motor 170 of the present invention. Motor 170 in the first embodiment of the refrigeration circuit 12 depicted in FIG. 2 and in the second embodiment of the refrigeration circuit depicted in FIG. 3 are identical. Motor 170 includes a housing 174, the housing having a central cavity 190. Within housing 174 and residing in central cavity 190 is a stator 176 and a rotor 178, rotor 178 positioned within stator 176. Stator 176 and rotor 178 are hermetically sealed within housing 174. A spacer 180 is positioned between housing 174 and stator 176, spacer 180 being a cylinder extending 360 degrees around stator 176. Spacer 180 also may be referred to as a sleeve. A compressor, such as compressor 20, may be attached to rotor 176 at attachment position 184 of FIG. 4. As shown, the impeller of the compressor may be bolted to rotor 178 so that the axis of the impeller is substantially coincident with the axis of the rotor. Any other known method of attaching a compressor to the motor 170 may be used. A preferred compressor is a centrifugal compressor, although any other compressor may be used with motor 170 of the present invention. Thus, motor 170 would also find use with a scroll compressor design or a screw compressor design as well as a centrifugal compressor design.

Housing 174 includes a helical annulus 182 that is in fluid communication with motor inlet 172. Helical annulus 182 extends within housing opposite spacer 180. Once refrigerant fluid enters motor through motor inlet 172, refrigerant flows through helical annulus contacting both spacer 180 and housing 174. When stator 176 is energized, the refrigerant, which preferably flows through helical annulus 182 as a liquid or as a two phase mixture comprising a liquid and a gas, absorbs heat from stator 176, at least a portion of the liquid changing state to a gas, as the flowing refrigerant also is at a lower temperature than the operating stator. The flowing refrigerant does not physically contact stator 176 because the refrigerant may leak through any gaps between stator laminations which are surrounded by windings, and adversely affect compressor efficiency by bypassing refrigerant from the condenser to the evaporator in excess of the amount needed for motor cooling, while creating a permanent leak path. According to the design, the flowing refrigerant will instead contact spacer 180, which will transfer heat from stator 176 to the refrigerant. Spacer 180 should be fabricated from a highly thermally conductive material. The stator laminations preferably are an iron-based alloy or steel, while the windings preferably are copper. This is desired because spacer 180 is attached to stator 176 by a shrink fit. Spacer 180 with stator 176 are prevented from rotating or moving axially relative to housing 174 by means of an alignment pin 222 extending through spacer 180 and at least partially into stator 176 and motor housing 174.

Also shown is an electronics enclosure 212 or box mounted on motor housing 174. Electronics enclosure 212 houses one or more circuit boards 218 to which electronic components 220 are mounted. When motor 170 is in operation, electronic components 220 generate a significant amount of heat that must be removed from electronics enclosure 212 to prevent damage to the components from heat buildup. To prevent this damage, heat is conducted through the bottom of enclosure 212. While heat may be conducted through the sides of enclosure 212, the space in which motor 170 is mounted may itself be subject to heat build-up which precludes effective cooling. To provide effective, reliable cooling, heat is transferred through enclosure 212 and into housing 174, to refrigerant flowing through helical annulus 182.

The physical transfer of heat from circuit boards 218 to housing 174 may be accomplished by any number of methods, but an effective mechanism for the transfer of heat generated by electronic components 220 is by conduction from boards 218 to refrigerant flowing in helical annulus 182 through motor housing 174. Thus, circuit boards 218 in enclosure 212 may be mounted on a conductive plate 214 as shown with a pliable conductive material 216 between plate 214 and boards 218 to eliminate any air gaps between plate 214 and boards 218 that might inhibit heat flow between boards 218 and plate 214. Plate 214 preferably is an aluminum plate, although copper or a low alloy aluminum or low alloy copper plate is also acceptable. It may be desirable to include pliable conductive material 216 between plate 214 and bottom of enclosure 212 and between enclosure 212 and housing 174, for the purposes of improving heat flow by conduction. Of course, the bottom of enclosure 212 itself may be plate 214. In this circumstance, pliable conductive material, which does not flow at elevated temperatures experienced by enclosure, and which may be for example a conductive grease, a conductive plastic or a moldable plastic or any other moldable conductive material, is placed between plate 214 and motor housing 174 if needed. Alternatively, boards 218 may be mounted directly to housing 174, with pliable conductive material 216 between boards 218 and housing 174 to improve thermal conductivity, and enclosure can be mounted around boards 218 as required.

As the refrigerant flowing through helical annulus 182 absorbs heat from stator 176 and electronics enclosure 212 through housing 174, at least some of the liquid will experience a change of state and convert to a gas. After the refrigerant has circulated through helical annulus 182, it then passes into another (third) expansion device 186, which may be an expansion valve. A fluid passageway 188 in motor housing connects helical annulus to expansion valve 186. Refrigerant, after absorbing heat from the stator while circulating through helical annulus 182, passes into expansion device 186 through passageway 188, where it cools and expands while its pressure is reduced, undergoing a change in state to a two-phase mixture of liquid entrained in a gas.

The refrigerant is then channeled to motor cavity 190. As depicted in FIG. 4, the refrigerant is channeled to motor cavity 190 through a second fluid passageway 192, shown as a fluid passageway in a portion of housing 174 extending from expansion device 186 to motor cavity 190. This second fluid passageway 192 is not restricted to being positioned within housing 174, as shown in FIG. 4, and may take a route external to housing 174 to connect expansion device 186 to motor cavity 190. However, the preferred fluid passageway 192 is depicted in FIG. 4. The refrigerant is then drawn across mechanical back-up bearings 194 and electromagnetic (EM) bearings 196 that support rotor 178, back-up bearings 194 and EM bearings 196 being positioned at either end of rotor 178 in motor cavity 190.

For a horizontally mounted motor, some of the refrigerant mist remains as a liquid and will fall by gravity to base of motor cavity 190. It will be understood that for a vertically mounted compressor, refrigerant liquid may condense and will fall by gravity to a location where it can be captured. The liquid then flows to liquid outlet 200. Liquid from liquid outlet 200 may then flow to evaporator 50 through a connecting conduit (not shown). It should be noted that condenser 30 is on the high pressure side of the refrigeration circuit, evaporator 50 is on the low pressure side of the refrigeration circuit and refrigerant flowing to cool motor 170 is at a pressure intermediate between condenser 30 and evaporator 50, so the difference in pressures between condenser 30, and the low pressure side of the system between expansion device 40 and compressor inlet, including evaporator 50, drives the flow of refrigerant through motor 170.

Refrigerant is then drawn through stator/rotor annulus 202, which is the gap between stator 176 and rotor 178. Refrigerant passing through stator/rotor annulus then passes over EM bearings 206 and mechanical backup bearings 204 at the end of motor 170 opposite the compressor. Refrigerant gas then passes through vent 208 and is returned to evaporator 210.

Figure 5:
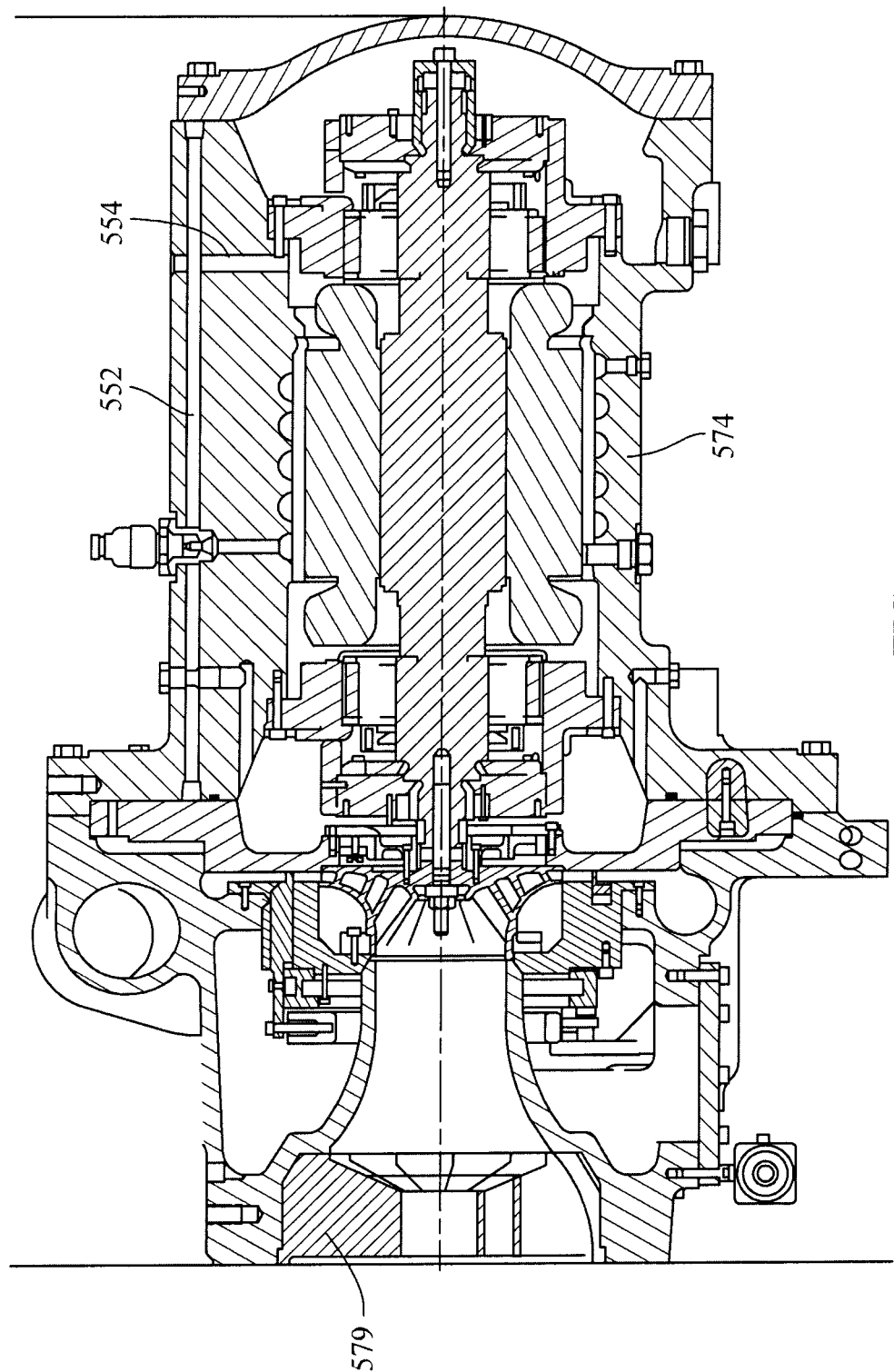
FIG. 5 is a cross section of a different embodiment of the motor of FIG. 4, but having an added passageway and associated orifice to provide additional cooling of the motor housing away from the center cavity housing the stator and rotor.

FIG. 5 depicts a cross section of a different embodiment of the motor of FIG. 4. The embodiment shown in FIG. 5 is substantially identical to the motor cross section depicted in FIG. 4. However, there are some minor differences. Motor 170 in FIG. 5 is rotated about its central axis extending longitudinally through rotor 178 so that electronics enclosure 212 is not visible in FIG. 5. Also, FIG. 5 depicts a centrifugal compressor 579 attached to motor housing 574 and rotor 178 at attachment position 184. It will be recognized by those of skill in the art that any rotatable compressor 20, such as, but not limited to a screw compressor or a scroll compressor may be attached to motor housing 574 or rotor 178. Motor housing 574 differs from motor housing 174 in that it includes at least one third fluid passageway 552 extending through the body of motor housing 574, the at least one third fluid passageway 552 extending axially through motor housing 174 and parallel to a central axis. As shown, the at least one third fluid passageway 552 extends substantially parallel to the central axis of motor 170 extending longitudinally through rotor 178. The at least one third fluid passageway 552 is connected to motor cavity 190 by at least one orifice 554.

In a preferred embodiment, there is one third fluid passageway 552 connected to motor cavity 190 by one orifice 554. Orifice 554 provides a pathway for a portion of the refrigerant entering through motor inlet 172 to enter third fluid passageway 552. Some of the refrigerant entering motor cavity 190 through motor inlet 172 is redirected into orifice 554, passing into third fluid passageway 552 and then connecting with second fluid passageway 192 after passing through third expansion device 186, where refrigerant from third fluid passageway 552 expands into a gas/liquid mist and mixes with fluid from second fluid passageway. The refrigerant redirected into third fluid passageway 552 through orifice 554 absorbs heat from the motor housing 174 as it traverses third fluid passageway 552 to provide a more even temperature through the motor housing as it cools portions of motor housing 174, such as its back end, these portions otherwise being remote from cooling flow between stator 176 and housing 174. Some of the redirected refrigerant as it traverses third fluid passageway 552 is evaporated into a gas as it absorbs heat from motor housing 174, and before it passes through third expansion device 186.

The present invention provides a novel method for cooling not only a motor, but also electromagnetic bearings and mechanical back-up bearings with compressors such as are used in heating and cooling applications. The design is particularly useful in systems utilizing EM bearings as the primary source of supporting shafts since these systems do not utilize lubricants. Lubricants must be separated from refrigerants and then resupplied to critical areas requiring lubrication. The present invention thus permits the use of refrigerant as a coolant for both the motor and the EM bearings while eliminating lubrication systems (including separation systems) normally associated with mechanical bearing systems. The cooling system of the present invention thus enables cooling of the motor utilizing refrigerant from the refrigeration circuit while removing concerns about refrigerant leakage through gaps that may be present between stator laminations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A cooling circuit for a compressor motor (170) and bearings (194, 204, 196, 206), the compressor motor (170) comprising a motor housing (174) with a cavity (190) that includes a stator (176) positioned within the housing (174) and a rotor (178) within the stator (176), and bearings centering the rotor within the stator, wherein the cooling circuit is characterized by:
   a motor inlet (172) in the motor housing (174) providing refrigerant liquid to the motor (170);
   a spacer (180) extending 360° around the stator (176) and positioned between the motor housing (174) and the stator;
   a gap between the spacer (180) and the stator (176) through which refrigerant liquid from the motor inlet (172) passes, the refrigerant liquid removing heat from the stator (176) and the motor housing (174) as the refrigerant changes state from liquid to a gas fluid;
   an alignment pin (222) extending through the motor housing (174) and the stator (176), preventing relative rotation of the motor housing, the stator and the spacer (182);
   an expansion device (186) reducing the pressure of refrigerant fluid while converting it to a two phase mixture;
   a first fluid passageway (188) that provides communications between refrigerant in the gap and the expansion device (186);
   a second fluid passageway (192) that receives two phase refrigerant mixture from the expansion device (186) while routing the refrigerant mixture to the motor housing cavity (174);
   a liquid outlet (200) to remove liquid refrigerant condensed from the mixture out of the motor housing (174);
   a stator/rotor annulus (202) between the stator and the rotor that receives the two phase refrigerant mixture from the second fluid passageway at a first end of the motor housing (174); and
   an evaporation vent (208) removing refrigerant fluid from a second end of the motor housing after passing through the annulus (202) and cooling bearings, the rotor and the stator.

2. The cooling circuit of claim 1 wherein the gap between the spacer (180) and the stator (176) is a helical annulus (182) in communication with motor inlet (172).

3. The cooling circuit of claim 1 wherein the bearings include mechanical bearings (194, 204).

4. The cooling circuit of claim 1 wherein the bearings include electromagnetic bearings (196, 206) and mechanical back-up bearings (194, 204).

5. The cooling circuit of claim 1 further including an electronics enclosure (212) mounted on the motor housing (174), the electronics enclosure cooled by refrigerant flowing through the motor housing (174).

6. A refrigeration system comprising a refrigerant, a compressor (20) for compressing the refrigerant and having a compressor motor (170), a condenser (30) in fluid communication with the compressor to receive compressed refrigerant from the compressor, an evaporator (50) in fluid communication with the condenser to receive refrigerant from the condenser, a first expansion device (40) intermediate the condenser and the evaporator to reduce the pressure of refrigerant liquid from the condenser to the evaporator, the condenser further in fluid communication with the compressor motor (170), providing refrigerant to the compressor motor to cool the motor, wherein the refrigeration system is characterized by:
   a compressor motor (170), the compressor motor further comprising
   a motor housing (174), the motor housing having a central cavity (190),
   a stator (176) positioned within the motor housing cavity (190),
   a rotor (178) positioned within the stator,
   bearings (194, 204, 196, 206) centering the rotor (178) within the stator (176) when the motor is operating;
   a motor housing refrigerant inlet (172) receiving refrigerant from the condenser (30) and providing refrigerant liquid to the compressor motor (170);
   a spacer (180) extending 360° around the stator and positioned between the motor housing (174) and the stator (176);
   a gap between the spacer and the stator through which refrigerant liquid from the motor inlet (172) passes, the refrigerant liquid removing heat from the stator and the motor housing as the refrigerant changes state from liquid to a gas fluid;

an alignment pin (222) extending through the motor housing (174) and the stator (176), preventing relative rotation of the motor housing, the stator and the spacer (180);

a second expansion device (186) reducing the pressure of refrigerant fluid while converting it to a two phase mixture;

a first fluid passageway (188) that provides communications between refrigerant in the gap and the second expansion device (186), a second fluid passageway (192) that receives two phase refrigerant mixture from the second expansion device (186) while routing the refrigerant mixture to the motor housing cavity (190);

a liquid outlet (200) in fluid communication with the evaporator (50) removing liquid refrigerant condensed from the mixture out of the motor housing (174);

a stator/rotor annulus (202) between the stator (176) and the rotor (178) that receives the two phase refrigerant mixture from the second fluid passageway (192) at a first end of the motor housing; and a vent (208) removing refrigerant fluid from a second end of the motor housing (174) to the refrigeration system between the first expansion device (40) and a compressor inlet after passing through the annulus (208) and cooling the bearings, the rotor and the stator.

7. The refrigeration system of claim 6 further including a third expansion device (41) positioned between the condenser (30) and the compressor motor (170) to reduce the pressure of refrigerant liquid from the condenser entering the motor inlet (172).

8. The refrigerant circuit of claim 6 wherein the gap between the spacer (180) and the stator is a helical annulus (182) in communication with motor inlet (172).

9. The refrigerant circuit of claim 6 wherein the motor housing (174) further includes a third fluid passageway (552) extending through the motor housing substantially parallel to a longitudinal central axis of the motor and in communication with motor cavity (554), receiving refrigerant entering motor cavity (190) through motor inlet (172), the refrigerant flowing through third fluid passageway (552) further cooling motor housing (174).

10. The refrigerant circuit of claim 9 wherein the third fluid passageway (552) is in further communication with the second expansion device (186), the second expansion device (186) expanding refrigerant fluid into a mist and discharging it into second fluid passageway (192).

11. The refrigerant circuit of claim 6, further including a subcooler (32) that receives and cools refrigerant liquid before providing the refrigerant to the motor inlet (172).

12. A method for cooling a compressor motor (170) having electromagnetic bearings (196, 206) in a refrigeration system utilizing a refrigerant and having a compressor (20) for compressing the refrigerant and having a compressor motor (170), a condenser (30) in fluid communication with the compressor to receive compressed refrigerant from the compressor, an evaporator (50) in fluid communication with the condenser to receive refrigerant from the condenser, a first expansion device (40) intermediate the condenser and the evaporator to reduce the pressure of refrigerant liquid from the condenser to the evaporator, the condenser further in fluid communication with the compressor motor (170), providing refrigerant to the compressor motor to cool the motor, the method comprising the steps of:

providing liquid refrigerant from the condenser (30);
cooling the liquid refrigerant;
providing the cooled refrigerant to a motor (170);
circulating the refrigerant between a motor stator (176) and a motor housing (174) to remove heat from the stator and the housing and cool the motor housing and stator; then
expanding the refrigerant a second time to cool the refrigerant while lowering its pressure a second time;
circulating the cooled and expanded refrigerant to cool the electromagnetic bearings (196, 206), the stator and rotor by passing the refrigerant over the bearings and a gap between the stator and rotor; and
returning the refrigerant from the motor to the evaporator (50).

13. The process of claim 12 wherein the step of cooling the liquid refrigerant further includes cooling liquid refrigerant from the condenser (30) in a subcooler (32) before providing the cooled refrigerant to the motor.

14. The process of claim 12 wherein the step of cooling the liquid refrigerant further includes cooling and expanding liquid refrigerant from the condenser (30) in a second expansion device (41) before providing the cooled refrigerant having lower pressure to the motor.

15. The process of claim 12 wherein the motor includes a spacer (180) between the stator (176) and the motor housing (178), and the motor housing (174) includes a helical annulus (182), the step of circulating the refrigerant between the motor stator and the motor housing further includes circulating the refrigerant through the helical annulus (182) to cool the motor housing and the stator.

\* \* \* \* \*